Sept. 28, 1965    K. SEIFERT    3,208,552
DEVICE FOR COOLING AND MUFFLING HOT GAS JETS
Filed Feb. 7, 1964    2 Sheets-Sheet 1
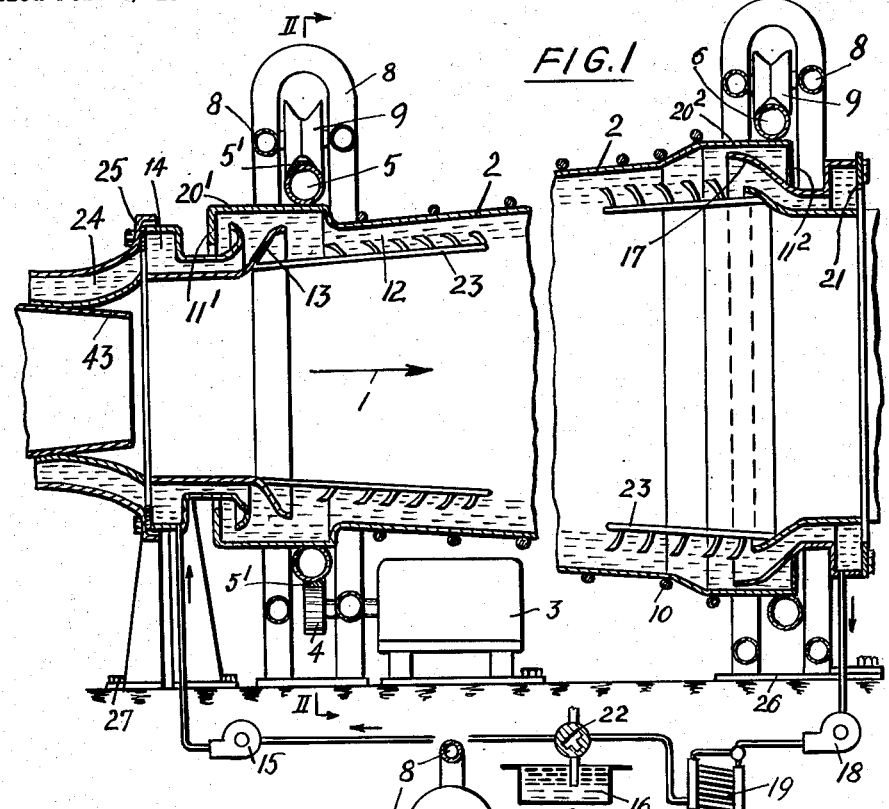
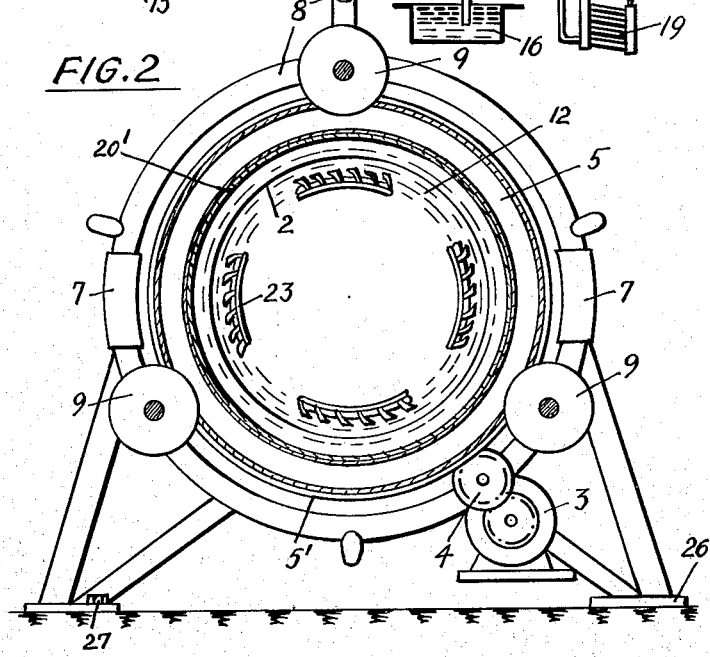
INVENTOR
Kurt Seifert
ATTYS.

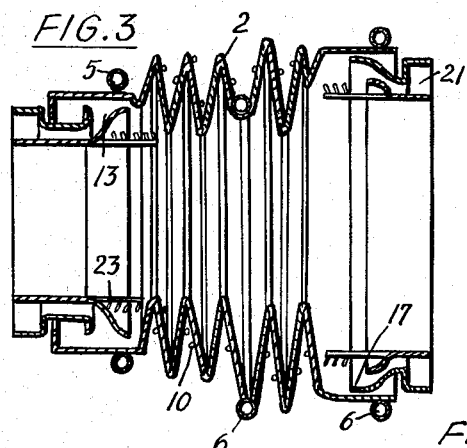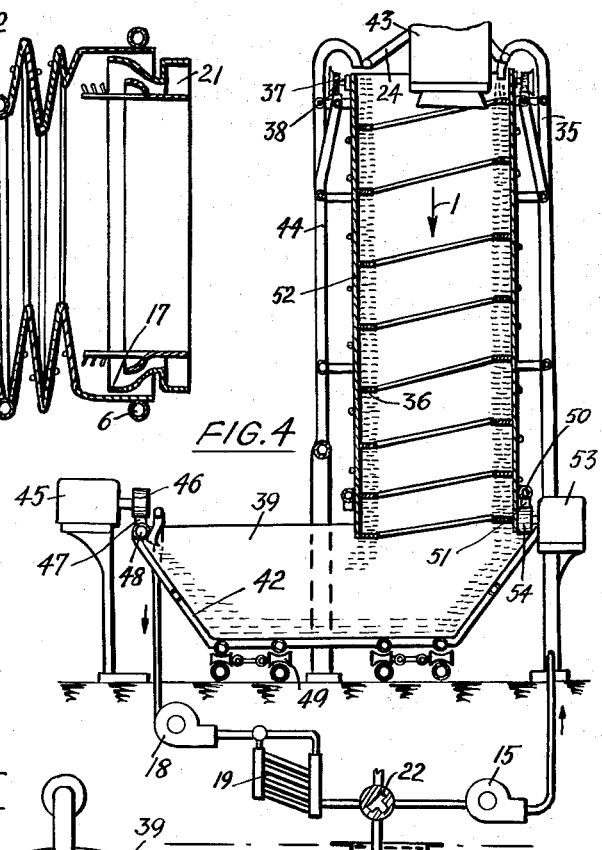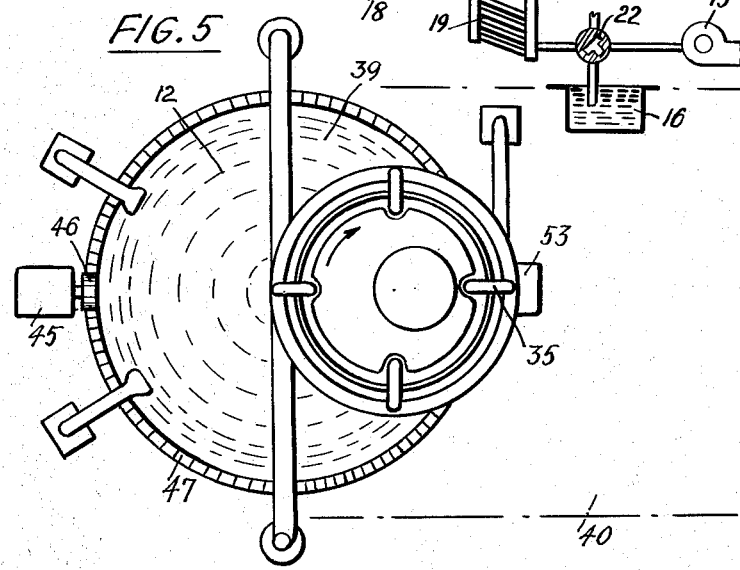

United States Patent Office 3,208,552
Patented Sept. 28, 1965

3,208,552
DEVICE FOR COOLING AND MUFFLING
HOT GAS JETS
Kurt Seifert, 36 Destouches Strasse, Munich, Germany
Filed Feb. 7, 1964, Ser. No. 343,409
5 Claims. (Cl. 181—52)

This invention relates to a device for cooling and muffling hot gas jets, particularly of jet engines and rocket drives.

It is known to feed outside air through mixing tubes into the hot exhaust gas jet and to enclose the latter by a cooling jacket.

It has also been tried to obtain cooling and silencing effects by water injection. Effective cooling of the exhaust gases becomes the more necessary the higher the jet drives increase in power. Especially personnel, measuring equipment, buildings, launching platforms and the like in the immediate vicinity of the hot exhaust gas jet must be protected from heat and sound waves. Grids and other structures arranged in the hot gas jet for reducing the sound intensity thereof are subjected to particularly high stresses. When a cooling liquid is used in the hitherto known devices, the parts thereof that are disposed adjacent or within the gas jet will be affected by corrosion.

It is the object of the present invention to eliminate the disadvantages of the known arrangements and to ensure effective cooling and muffling of hot gas jets.

This object is attained according to the invention by the provision of a device of the initially specified type which comprises a rotatable gas duct, with means for rotating said gas duct about its longitudinal axis, and means for producing an annular cooling liquid coating on the inner surface of said gas duct during rotation thereof. In this arrangement, the hot gas jet will directly contact the inner surface of the annular cooling liquid coating.

Conveniently, a water-ring stuffing box may be provided for sealing said gas duct off against a jet pipe, thereby to obtain reliable acoustic insulation over a range extending from the jet pipe to the discharge end of the gas duct.

By using a gas duct which is conically flaring in the direction of flow of the gas jet the cooling liquid will be circulated in a manner ensuring more efficient cooling of the hot gas jet than can be obtained by a stationary cooling liquid or one that circulates but weakly.

The efficiency of sound absorption will be determined by the quantity of cooling liquid.

A stationary inner pipe may be arranged to extend coaxially into the gas duct and combs may be disposed on this stationary inner pipe within the gas duct for roughening the inner surface of the annular cooling liquid coating.

The gas duct may also consist of flexible material as this will be stretched during rotation by the centrifugal action of the cooling liquid.

The known structures provided to surround the gas jet after this has left the jet pipe have hitherto been of rigid design using materials such as steel, as for example for mixing tubes and mufflers, or channels consisting of brickwork or concrete.

By using flexible materials such as plastic or reinforced rubber a reduction in weight is obtained in comparison with the known rigid structures which, moreover, cannot be transported as easily as a collapsible device. The latter feature gains still more importance in the light of the fact that the silencing or sound-muffling medium according to the invention is a liquid, for example water, and thus need not necessarily be transported along with the device but in most of the cases will be easily procurable in situ.

In the case of a flexible gas duct, furthermore, efficiency-imparing sound radiation owing to the excitation of bending oscillations are practically eliminated, since flexible materials have only a negligible bending resistance. In the known devices, unexpected sound radiation frequently could only be reduced by using additional sound-absorbing materials.

In the device proposed by the present invention, the gas duct need not be made of highly heat-resisting material, which is to be considered an additional advantage over the known structures used for this purpose.

Expediently, a helical baffle may be secured to the inner surface of the gas duct so that the device proposed by the invention can also be arranged to extend in a plane different from the horizontal, e.g. when used with rockets. By this helical baffle the cooling liquid is prevented from directly pouring down. In this arrangement, when the device extends substantially in a vertical plane a rotatable vessel partially filled with a liquid may be disposed below the gas duct the lower end of which projects into the rotatable vessel so that the hot gas jet will be deviated and additionally cooled by the surface of the liquid in the vessel.

The rotatable vessel may be arranged to run on rollers and be recessed in its middle portion to be filled with earth or concrete. This arrangement is intended to serve as a heat and sound protection for personnel, platform, structures, power units, leads, conduits and the like in the immediate vicinity of the hot gases, and is brought about by unilateral deviation of the gas jet. For this purpose, heavy concrete constructions with or without water-cooling had hitherto to be built.

Two preferred embodiments of the invention will now be described by way of example and with reference to the accompanying drawings, in which:

FIG. 1 is a longitudinal section through a device for cooling and muffling gas jets according to the present invention, which is mounted in horizontal arrangement and in series with a jet engine to the rear end of which it is applied, a middle portion of the device being broken away for the sake of space saving;

FIG. 2 is a cross section taken on the line II—II of FIG. 1;

FIG. 3 is a longitudinal section, on a reduced scale, through the device as collapsed for transport;

FIG. 4 is a schematic view, partly in section, of a different embodiment of the device according to the invention, and FIG. 5 is a top plan view of FIG. 4.

With reference now to the drawings and particularly to FIG. 1, the device for cooling and muffling gas jets proposed by the present invention comprises a flexible gas duct 2 that can be driven to rotate about its longitudinal axis by an electric motor 3 through the intermediary of a reduction gear 4 and a pipe or tube 5 annularly disposed around the gas duct 2 and provided with a gear rim $5^1$.

A hot gas jet coming forth, for example, from a jet engine 43 will pass through the rotatable gas duct 2 in a direction designated by an arrow 1.

To prevent the flexible gas duct 2 from unduly sagging, pipes 6 are annularly arranged around the outer surface of the gas duct 2 and secured thereto at predetermined distances apart from one another. Contrary to the annular pipe 5, the pipes or tubes 6 are not provided with a gear rim but serve to reinforce, align and support the flexible gas duct 2.

The gas duct 2 is mounted in supporting frames 8 composed of lower and upper parts and carrying profile rollers 9 as shown in FIG. 2. The lower parts are connected with pressure-distributing base plates 26 anchored to the ground by means of anchoring bolts 27. The upper parts and the lower parts of the frames 8 are fitted together by means of sockets 7. When installing the gas duct 2, first the lower parts of the supporting frames 8 are brought in alignment and anchored to the ground. Secondly, the topmost rollers 9 of the upper parts of the supporting frames 8 are positively placed on the annular pipes 5 and 6, respectively, and secured to the lower parts of the supporting frames 8 by means of the sockets 7. Ropes 10 of steel or plastic which are circularly or helically arranged around the flexible gas duct 2 prevent the latter from too heavily bulging during rotation.

The ends of the gas duct 2 are provided with inwardly directed flanges $11^1$ and $11^2$, respectively, the radial extension of which determines the maximum thickness of an annular cooling liquid coating 12 produced on the inner surface of the gas duct 2 during rotation thereof. The cooling liquid is admitted to the interior of the gas duct 2 through an annular clearance jet 13 disposed at one end thereof and engaging with a bent portion around the inwardly extending flange $11^1$. The base of the annular clearance jet 13 is designed to form a casing 14. By a pump 15 the cooling liquid is delivered from a reservoir 16 into the casing 14. At the other end of the gas duct 2 there is arranged a similar annular clearance jet 17 for the discharge of the rotating cooling liquid that will be sucked off by a pump 18 and recirculated after having passed an interpositioned cooler 19.

The gas duct 2 is provided at either end with a bead-like widened portions $20^1$ and $20^2$, respectively, so that the annular clearance jets 13 and 17 can immerge deep enough into the cooling liquid coating 12. The annular clearance jets 13 and 17 and the bead-like widened portions $20^1$ and $20^2$ will be referred to hereinafter as the water-ring stuffing boxes 13, $20^1$ and 17, $20^2$.

As shown in FIG. 1, a three-way cock 22 is provided to control the feed of the cooling liquid so that it is supplied to the rotating gas duct 2 either from the reservoir 16 or from the circulation after having passed the cooler 19 or even from both the reservoir 16 and the circulation at the same time. It is also possible that the pump 15 alone may operate independently of the cooler 19 and the cooler 19 may be dispensed with.

During operation of the device, liquid losses incurred through evaporation and leakage are compensated from the reservoir 16.

Combs 23 extend from the water-ring stuffing boxes 13,, $20^1$ and 17, $20^2$ into the gas duct 2 and are provided for agitating the inner surface of the annular cooling liquid coating 12.

The gas duct 2 is connected to the end of the jet engine 43 by means of a flexible double-walled jacket 24 which is filled with a liquid. One end of the jacket 24 tightly fits around the end of the jet engine 43, while the other end thereof is provided with a flange 25 for the supporting connection with the annular clearance jet 13.

To facilitate transport of the device, the gas duct 2 can be collapsed in accordian-like fashion as shown in FIG. 3.

FIGS. 4 and 5 illustrate a different embodiment of the present invention, using the same reference numerals for parts similar to parts already described with reference to FIGS. 1 to 3.

As shown in FIG. 4, the device for cooling and muffling hot gas jets comprises a vertically arranged rotatable gas duct 52 arranged above a rotatable vessel 39 having a relatively large surface area. In this arrangement, the gas jet passing through the gas duct 52 in the direction indicated by the arrow 1 will be laterally deviated by the rotating vessel 39 thereby to create a protective zone 40 (FIG. 5) against destruction by heat and sound. The supporting structure of the device consists of pipes 35 and 44 which are used at the same time for the cooling liquid supply. In order to prevent the cooling liquid, which through the pipes 35 and 44 is fed into the vertical gas duct 52 from above, from directly pouring down, a helical baffle 36 extending from top to bottom of the vertical gas duct 52 is secured to the inner wall of the duct 52 so that the cooling liquid can smoothly run down thereon.

Through the intermediary of wheels 37 the vertical gas duct 52 is rotatably supported on an annular track 38 surrounding the top end of the gas duct 52. The vertical gas duct 52 can be driven by an electric motor 53, arranged at the lower end thereof, through a reduction gear 54 in meshing engagement with a toothed rim 51 carried by a pipe frame 50 at the lower end of the vertical gas duct 52.

The rotatable vessel 39 is collapsible and carried by rollers 49. The supporting framework of the collapsible vessel 39 consists of a dismountable tube structure 42. For driving the rotatable vessel 39, a motor 45 is provided which is connected with a reduction gear 46 in meshing engagement with a toothed rim 47 carried by a pipe frame 48 at the upper end of the rotatable vessel 39. The gas ducts 2 and 52 described with reference to the embodiments shown in FIGS. 1 to 3 and 4 and 5, respectively, may also consist of rigid materials or of any combination of flexible and rigid materials.

In most of the cases it will be convenient to use water as a cooling liquid which, however, may also be mixed with loam, sand, gravel or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A device for cooling and muffling hot gas jets, particularly of jet engines and rocket drives, comprising a rotatable gas duct, means for rotating said gas duct about its longitudinal axis, means for producing an annular cooling liquid coating on the inner surface of said gas duct during rotation thereof, and a water-ring stuffing box for sealing said gas duct off against a jet pipe.

2. A device for cooling and muffling hot gas jets, particularly of jet engines and rocket drives, comprising a rotatable gas duct, means for rotating said gas duct about its longitudinal axis, means for producing an annular cooling liquid coating on the inner surface of said gas duct during rotation thereof, and a stationary pipe extending coaxially into said gas duct and combs disposed on said pipe within said gas duct.

3. A device for cooling and muffling hot gas jets, particularly of jet engines and rocket drives, comprising a rotatable gas duct, means for rotating said gas duct about its longitudinal axis, means for producing an annular cooling liquid coating on the inner surface of said gas duct during rotation thereof, and annular clearance jets at the upstream and downstream ends of said gas duct for admitting and discharging, respectively, a cooling liquid.

4. A device for cooling and muffling hot gas jets, particularly of jet engines and rocket drives, comprising a rotatable gas duct, means for rotating said gas duct about its longitudinal axis, and means for producing an annular cooling liquid coating on the inner surface of said gas duct during rotation thereof, and said gas duct extending in a plane different from the horizontal and a helical baffle secured to the inner surface of said gas duct.

5. A device for cooling and muffling hot gas jets, particularly of jet engines and rocket drives, comprising a rotatable gas duct, means for rotating said gas duct about its longitudinal axis, and means for producing an annular cooling liquid coating on the inner surface of said gas duct during rotation thereof, said gas duct being arranged at least substantially in a vertical position and a rotatable vessel arranged below said gas duct and partially filled with a liquid, the lower end of said gas duct extending into said rotatable vessel.

References Cited by the Examiner

UNITED STATES PATENTS

| | | | |
|---|---|---|---|
| 1,695,375 | 12/28 | Heather. | |
| 2,866,313 | 12/58 | Holl | 60—35.6 |
| 2,942,685 | 6/60 | Caddell | 181—64 |
| 3,001,452 | 9/61 | Urban et al. | 181—33 |
| 3,047,091 | 7/62 | Gerli | 181—67 |

LEO SMILOW, *Primary Examiner.*